(12) United States Patent
Yang

(10) Patent No.: US 9,243,699 B2
(45) Date of Patent: Jan. 26, 2016

(54) BI-DIRECTIONAL INPUT, ONE-WAY OUTPUT WHEEL SYSTEM

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 0 days.

(21) Appl. No.: 13/706,567

(22) Filed: Dec. 6, 2012

(65) Prior Publication Data

US 2014/0162829 A1    Jun. 12, 2014

(51) Int. Cl.
| F16H 3/44 | (2006.01) |
| F16H 3/10 | (2006.01) |
| F16H 37/06 | (2006.01) |
| F16H 3/00 | (2006.01) |

(52) U.S. Cl.
CPC .............. *F16H 37/065* (2013.01); *F16H 3/003* (2013.01); *F16H 3/005* (2013.01)

(58) Field of Classification Search
CPC ....... F16H 3/005; F16H 3/003; B62M 11/145
USPC ........................ 475/294, 12, 297; 74/319, 322
See application file for complete search history.

(56) References Cited

U.S. PATENT DOCUMENTS

| 5,607,369 A * | 3/1997 | Yang ............................. 475/12 |
| 2011/0177902 A1* | 7/2011 | Yang ............................. 475/12 |
| 2011/0185848 A1* | 8/2011 | Yang ........................... 74/810.1 |
| 2011/0190086 A1* | 8/2011 | Yang ............................. 475/12 |
| 2011/0201468 A1* | 8/2011 | Yang ............................. 475/12 |
| 2011/0201469 A1* | 8/2011 | Yang ............................. 475/12 |

\* cited by examiner

*Primary Examiner* — Ramya Burgess
*Assistant Examiner* — Lillian Nguyen
(74) *Attorney, Agent, or Firm* — Bacon & Thomas, PLLC

(57) ABSTRACT

A wheel system with bidirectional input and one-way output includes a unidirectional transmission device respectively installed between a first driving rotating directional input wheel set and a bidirectional input shaft, between a first driving rotating directional output wheel set and a constant rotating directional output rotation part, and between the constant rotating directional output rotation part and the bidirectional input shaft, thereby preventing the first rotating direction transmission wheel set from being coupled to and generating a power transmission dampening effect while being driven in the second driving rotating direction.

20 Claims, 4 Drawing Sheets

BI-DIRECTIONAL INPUT, ONE-WAY OUTPUT WHEEL SYSTEM

BACKGROUND OF THE INVENTION 1. (a) Field of the Invention

The present invention relates to an improved bi-directional output, one-way output wheel system, applied in a power system driven by a manual force or engine or electric motor or fluid motor; through controlling the changing of the rotating direction of an input shaft, the bi-rotating directional input and constant rotating directional output wheel system capable of preventing the first direction transmission wheel set from idling and thereby serving as a load that dampens reverse rotation of the wheel system so that the wheel system generates an output with the same or different speed ratio while being rotated in different input rotating directions. The wheel system is characterized in that: a unidirectional transmission device is respectively installed between a first driving rotating directional input wheel set and a bidirectional input shaft, between a first driving rotating directional output wheel set and a constant rotating directional output rotation part and between the constant rotating directional output rotation part and the bidirectional input shaft, thereby preventing the first rotation direction transmission wheel set from being coupled to and providing an additional load that dampens power transmission when the input shaft is being driven in the second reverse driving rotating direction.

2. (b) Description of the Prior Art

In a conventional bi-rotating directional input and constant rotating directional output wheel system, while being operated in one of the two bi-rotating input directions, the wheel set in another input direction is still driven, the disadvantages is that a part of the wheel set generates idle rotation which provides a drag on the input shaft and thereby dampens transmission of power to the output shaft.

SUMMARY OF THE INVENTION

In a conventional bi-rotating directional input and constant rotating directional output wheel system, while being operated in one of the two bi-rotating input directions, the wheel set in another input direction is still driven, with the disadvantage that a part of the wheel set is in an idle state rather than being completely decoupled, with the result that the wheel set acts as a load and dampens power transmission in the reverse direction;

The present invention relates to an improved bi-directional input, one-way output wheel system, applied in a power system driven by a manual force or engine or electric motor or fluid motor; through controlling the changing of the rotating direction of an input shaft, the bi-rotating directional input and constant rotating directional output wheel system capable of preventing the first direction transmission wheel set from idling and thereby serving as a load that dampens reverse rotation of the wheel system so that the wheel system generates an output with the same or different speed ratio while being rotated in different input rotating directions. The wheel system is characterized in that: a unidirectional transmission device is respectively installed between a first driving rotating directional input wheel set and a bidirectional input shaft, between a first driving rotating directional output wheel set and a constant rotating directional output rotation part and between the constant rotating directional output rotation part and the bidirectional input shaft, thereby preventing the first rotation direction transmission wheel set from being coupled to and providing an additional load that dampens power transmission when the input shaft is being driven in the second reverse driving rotating direction.

DESCRIPTION OF MAIN COMPONENT SYMBOLS

Figure 1:
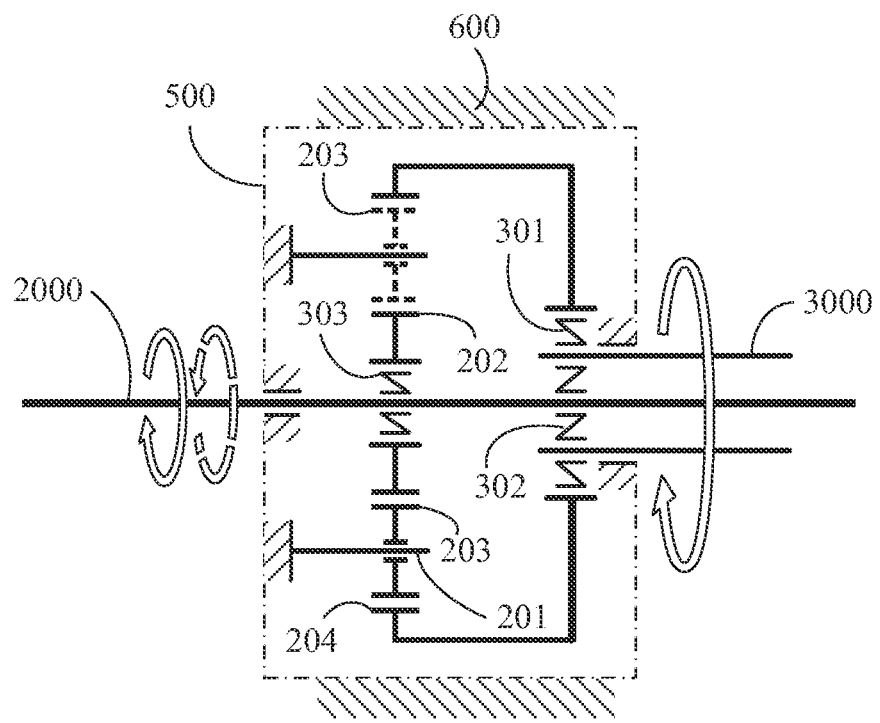
FIG. 1 is a schematic view showing the bi-rotating directional input and constant rotating directional output wheel system capable of preventing reverse rotation wheel system from generating a damping effect according to one embodiment of the present invention.

201: Planetary gear shaft
202: Sun gear
203: Planetary gear
204: Outer annular wheel
301, 302, 303: Unidirectional transmission device
400: Annular support rack of epicycle gear
401: Epicycle gear shaft
402: Inner bevel wheel
403: Epicycle gear
404: Outer bevel wheel
500: Housing of transmission wheel system
600: Machine body
602, 603, 605, 606, 615, 616, 617: Transmission wheel
604, 618: Rotation shaft
607: Transmission belt
2000: Input shaft
3000: Output shaft
3001: Revolving load
CL100: Clutch device

DETAILED DESCRIPTION OF THE PREFERRED EMBODIMENTS

In a conventional bi-rotating directional input and constant rotating directional output wheel system, while being operated in one of the two bi-rotating input directions, the wheel set in another input direction would be driven, the disadvantages is that a part of the wheel set generates idle rotating and thereby acts as a power-transmission dampening load;

The present invention relates to an improved bi-rotating directional input and constant rotating directional output wheel system, applied in a power system driven by a manual force or engine or electric motor or fluid motor; through controlling the changing of the rotating direction of an input shaft, the bi-rotating directional input and constant rotating directional output wheel system capable of preventing reverse rotation wheel system from generating a damping effect is enabled to generate output with the same or different speed ratio while being in different input rotating direction, and characterized in that: a unidirectional transmission device is respectively installed between a first driving rotating directional input wheel set and a bidirectional input shaft, between a first driving rotating directional output wheel set and a constant rotating directional output rotation part and between the constant rotating directional output rotation part and the bidirectional input shaft, thereby preventing the transmission set in the first driving rotating direction from being linked and generating the a damping effect while being driven in a second driving rotating direction.

FIG. 1 is a schematic view showing the bi-rotating directional input and constant rotating directional output wheel system capable of preventing reverse rotation wheel system from generating a damping effect according to one embodiment of the present invention;

As shown in FIG. 1, configured by a planetary gear system, the input shaft and the output shaft are coaxially sleeved, it mainly consists:

one end of the input shaft (2000) is installed to penetrate through a housing of transmission wheel system (500) through a bearing structure, the other end of the input shaft (2000) is installed to penetrate through the output shaft (3000) through a unidirectional transmission device (302), and a bearing is installed between the output shaft (3000) and the housing of transmission wheel system (500);

housing of transmission wheel system (500): combined in a machine body (600), the housing of transmission wheel system (500) is served to be installed with the machinery components which are adopted by assembling the bi-rotating directional input and constant rotating directional output wheel system capable of preventing reverse rotation wheel system from generating following damp;

machine body (600): formed as a relatively static machinery structural body;

a unidirectional transmission device (303) is installed between the input shaft (2000) and a sun gear (202);

a planetary gear (203) is installed between an outer annular wheel (204) and the sun gear (202); the center of the planetary gear (203) revolves on a planetary gear shaft (201), and one end of the planetary gear shaft (201) is fastened in the housing of transmission wheel system (500);

a unidirectional transmission device (301) is installed between the annular structural body of the outer annular wheel (204) and the output shaft (3000);

the sun gear (202), the planetary gear (203) and the outer annular wheel (204) are configured by gears or friction wheels;

according to the disclosed structure, the input shaft (2000) is driven in the first driving rotating direction, and through the unidirectional transmission device (302), the output shaft (3000) is driven for performing the first driving rotating directional output thereby forming a first transmission wheel system; at this moment, the unidirectional transmission device (301) and the unidirectional transmission device (303) are in the idle rotating state;

according to the disclosed structure, the input shaft (2000) is driven in the second driving rotating direction; through the unidirectional transmission device (303), the sun gear (202) is driven then the planetary gear (203) and the outer annular wheel (204) are driven; further through the annular structural body of the outer annular wheel (204) and the unidirectional transmission device (301), the output shaft (3000) is driven for outputting in the same rotating direction as the first driving rotating direction thereby forming a second transmission wheel system; at this moment, the unidirectional transmission device (302) is in the idle rotating state.

Figure 2:
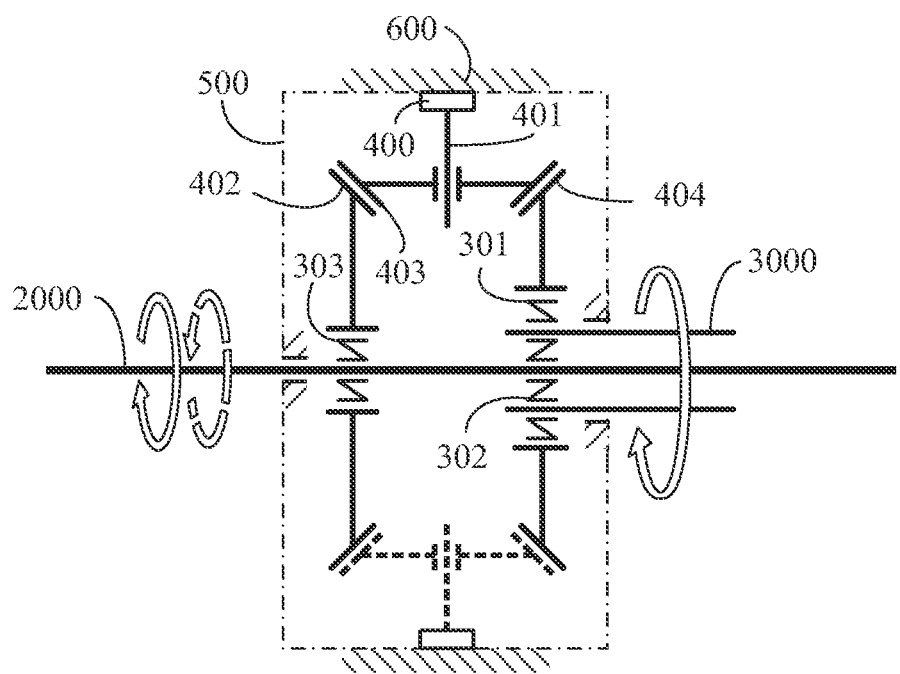
FIG. 2 is the second schematic view showing the bi-rotating directional input and constant rotating directional output wheel system capable of preventing reverse rotation wheel system from generating a damping effect according to one embodiment of the present invention.

FIG. 2 is the second schematic view showing the bi-rotating directional input and constant rotating directional output wheel system capable of preventing reverse rotation wheel system from generating a damping effect according to one embodiment of the present invention;

As shown in FIG. 2, configured by an epicycle gear system, the input shaft and the output shaft are coaxially sleeved, it mainly consists:

one end of the input shaft (2000) is installed to penetrate through a housing of transmission wheel system (500) through a bearing structure, the other end of the input shaft (2000) is installed to penetrate through the output shaft (3000) through a unidirectional transmission device (302), and a bearing is installed between the output shaft (3000) and the housing of transmission wheel system (500);

housing of transmission wheel system (500): combined in a machine body (600), the housing of transmission wheel system (500) is served to be installed with the machinery components which are adopted by assembling the bi-rotating directional input and constant rotating directional output wheel system capable of preventing reverse rotation wheel system from generating following damp;

machine body (600): formed as a relatively static machinery structural body;

the unidirectional transmission device (303) is installed between the input shaft (2000) and an inner bevel wheel (402);

an epicycle gear (403) is installed between an outer bevel wheel (404) and the inner bevel wheel (402); the center of the epicycle gear (403) revolves on an epicycle gear shaft (401); one end of the epicycle gear shaft (401) is combined on an annular support rack of epicycle gear (400), and the annular support rack of epicycle gear (400) is fastened in the housing of transmission wheel system (500);

the unidirectional transmission device (301) is installed between the outer bevel wheel (404) and the output shaft (3000);

the inner bevel wheel (402), the epicycle gear (403) and the outer bevel wheel (404) are configured by gears or friction wheels;

the relation of transmission ratio of the inner bevel wheel (402) driving the epicycle gear (403) can be acceleration, deceleration or equal speed;

the relation of transmission ratio of the epicycle gear (403) driving the outer bevel wheel (404) can be acceleration, deceleration or equal speed;

according to the disclosed structure, the input shaft (2000) is driven in the first driving rotating direction, and through the unidirectional transmission device (302), the output shaft (3000) is driven for performing the first driving rotating directional output thereby forming a first transmission wheel system; at this moment, the unidirectional transmission device (301) and the unidirectional transmission device (303) are in the idle rotating state;

according to the disclosed structure, the input shaft (2000) is driven in the second driving rotating direction, through the unidirectional transmission device (303), the inner bevel wheel (402) is driven then the epicycle gear (403) and the outer bevel wheel (404) are driven; further through the outer bevel wheel (404) and the unidirectional transmission device (301), the output shaft (3000) is driven for outputting in the same rotating direction as the first driving rotating direction thereby forming a second transmission wheel system; at this moment, the unidirectional transmission device (302) is in the idle rotating state.

Figure 3:
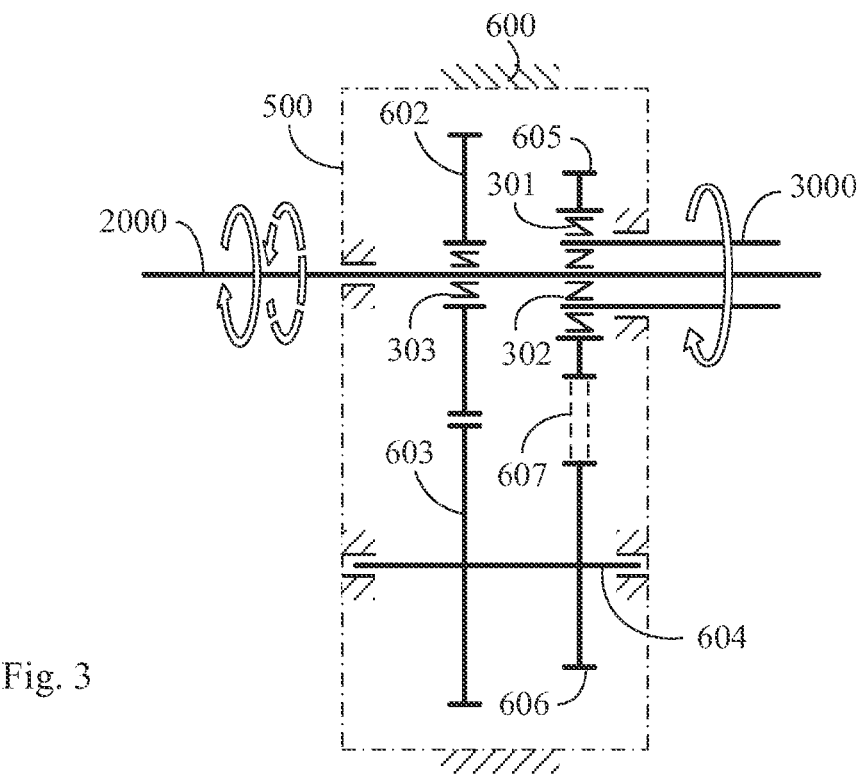
FIG. 3 is the third schematic view showing the bi-rotating directional input and constant rotating directional output wheel system capable of preventing reverse rotation wheel system from generating a damping effect according to one embodiment of the present invention.

FIG. 3 is the third schematic view showing the bi-rotating directional input and constant rotating directional output wheel system capable of preventing reverse rotation wheel system from generating a damping effect according to one embodiment of the present invention;

As shown in FIG. 3, configured by transmission devices in different transmission rotating directions, the input shaft and the output shaft are coaxially sleeved, it mainly consists:

one end of the input shaft (2000) is installed to penetrate through a housing of transmission wheel system (500) through a bearing structure, the other end of the input shaft (2000) is installed to penetrate through the output shaft (3000) through a unidirectional transmission device (302); a bearing is installed between the output shaft (3000) and the housing of transmission wheel system (500);

housing of transmission wheel system (500): combined in a machine body (600), the housing of transmission wheel system (500) is served to be installed with the machinery components which are adopted by assembling the bi-rotating directional input and constant rotating directional output wheel system capable of preventing reverse rotation wheel system from generating following damp;

machine body (600): formed as a relatively static machinery structural body;

the input shaft (2000) penetrates a transmission wheel (602), and the unidirectional transmission device (303) is installed between the above two;

the transmission wheel (602) and a transmission wheel (603) perform transmission in different rotating directions, the transmission wheel (603) and a transmission wheel (606) are jointly combined on a rotation shaft (604), and a bearing is installed between the rotation shaft (604) and the housing of transmission wheel system (500);

the transmission wheel (602), (603) is configured by a gear or friction wheel;

the transmission wheel (605), (606) is configured by a pulley or chain wheel;

the transmission wheel (606) and the transmission wheel (605) is configured by a pulley driven by a transmission belt (607) or chain wheel or an inner gear set of a transmission wheel set in the same rotating direction;

the unidirectional transmission device (301) is installed between the transmission wheel (605) and the output shaft (3000);

the relation of transmission ratio between the transmission wheel sets in different rotating directions can be acceleration, deceleration or equal speed;

the relation of transmission ratio between the transmission wheel sets in the same rotating direction can be acceleration, deceleration or equal speed;

the transmission wheel set in the same rotating direction includes being installed with the transmission belt (607) including being configured by a pulley with a flat belt, V-shaped belt, tooth belt or steel belt, or a chain wheel provided with a chain;

according to the disclosed structure, the input shaft (2000) is driven in the first driving rotating direction, and through the unidirectional transmission device (302), the output shaft (3000) is driven for performing the first driving rotating directional output thereby forming a first transmission wheel system; at this moment, the unidirectional transmission device (301) and the unidirectional transmission device (303) are in the idle rotating state;

according to the disclosed structure, the input shaft (2000) is driven in the second driving rotating direction, through the unidirectional transmission device (303), the transmission wheel (602) is driven, then the transmission wheel (602) drives the transmission wheel (603) and the transmission wheel (606), then the transmission wheel (606) further drives the transmission wheel (605), so as to drive the output shaft (3000) through the unidirectional transmission device (301) for outputting in the first driving rotating direction thereby forming a second transmission wheel system; at this moment, the unidirectional transmission device (302) is in the idle rotating state.

Figure 4:
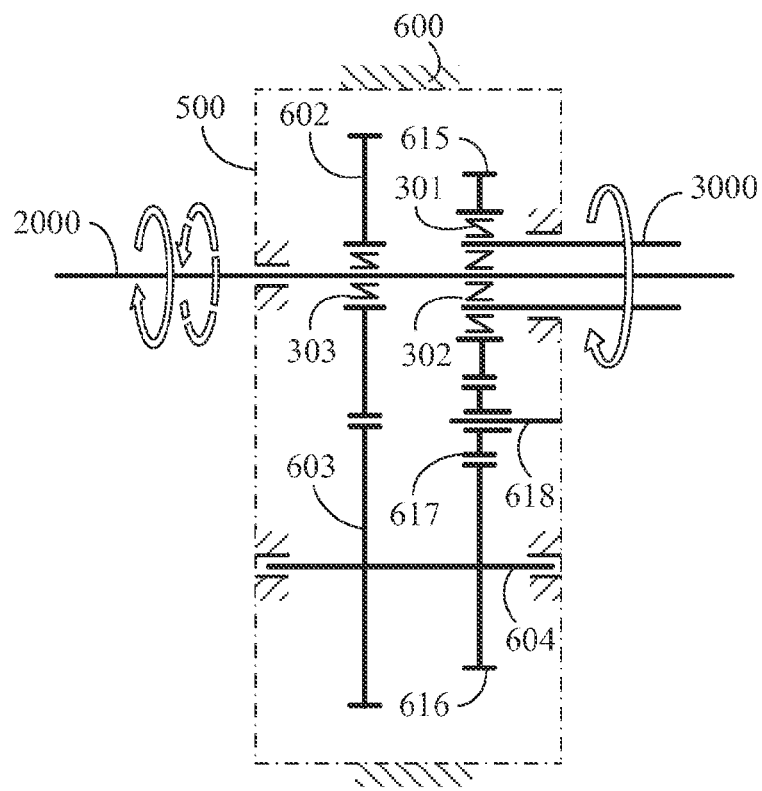
FIG. 4 is the fourth schematic view showing the bi-rotating directional input and constant rotating directional output wheel system capable of preventing reverse rotation wheel system from generating a damping effect according to one embodiment of the present invention.

FIG. 4 is the fourth schematic view showing the bi-rotating directional input and constant rotating directional output wheel system capable of preventing reverse rotation wheel system from generating a damping effect according to one embodiment of the present invention;

As shown in FIG. 4, configured by a gear set or friction wheel set in different transmission rotating directions, the input shaft and the output shaft are coaxially sleeved, it mainly consists:

one end of the input shaft (2000) is installed to penetrate through a housing of transmission wheel system (500) through a bearing structure, the other end of the input shaft (2000) is installed to penetrate through the output shaft (3000) through a unidirectional transmission device (302), and a bearing is installed between the output shaft (3000) and the housing of transmission wheel system (500);

housing of transmission wheel system (500): combined in a machine body (600), the housing of transmission wheel system (500) is served to be installed with the machinery components which are adopted by assembling the bi-rotating directional input and constant rotating directional output wheel system capable of preventing reverse rotation wheel system from generating following damp;

machine body (600): formed as a relatively static machinery structural body;

the input shaft (2000) penetrates a transmission wheel (602), and the unidirectional transmission device (303) is installed between the above two;

the transmission wheel (602) and a transmission wheel (603) perform transmission in different rotating directions, the transmission wheel (603) and a transmission wheel (616) are jointly combined on a rotation shaft (604), and a bearing is installed between the rotation shaft (604) and the housing of transmission wheel system (500);

a transmission wheel (616) drives the transmission wheel (617) revolving on the rotation shaft (618) then drives the transmission wheel (615) thereby forming the transmission wheel set in the same rotating direction;

the rotations shaft (618) is combined in the housing of transmission wheel system (500), the transmission wheel (617) revolves on the rotation shaft (618); or the transmission wheel (617) is combined on the rotation shaft (618) and the transmission wheel (617) and the rotation shaft (618) jointly perform the revolving operation, and a bearing is installed between the rotation shaft (618) and the housing (500);

the transmission wheel (615) is sleeved on the output shaft (3000), and the unidirectional transmission device (301) is installed between the above two;

the transmission wheel (602), (603), (615), (616), (617) is configured by a gear or friction wheel;

the relation of transmission ratio between the transmission wheel sets in different rotating directions can be acceleration, deceleration or equal speed;

the relation of transmission ratio between the transmission wheel sets in the same rotating direction can be acceleration, deceleration or equal speed;

the transmission wheel set in the same rotating direction includes being installed with an inner gear set or inner friction wheel set;

according to the disclosed structure, the input shaft (2000) is driven in the first driving rotating direction, and through the unidirectional transmission device (302), the output shaft (3000) is driven for performing the first driving rotating directional output thereby forming a first transmission wheel system; at this moment, the unidirectional transmission device (301) and the unidirectional transmission device (303) are in the idle rotating state;

according to the disclosed structure, the input shaft (2000) is driven in the second driving rotating direction, through the unidirectional transmission device (303), the transmission wheel (602) is driven, then the transmission wheel (602) drives the transmission wheel (603) and the transmission wheel (616), then the transmission wheel (616) further drives the transmission wheel (615) through the transmission wheel (617); and through the unidirectional transmission device (301), the transmission wheel (615) drives the output shaft (3000) for outputting in the first driving rotating direction thereby forming a second transmission wheel system; at this moment, the unidirectional transmission device (302) is in the idle rotating state.

Figure 5:
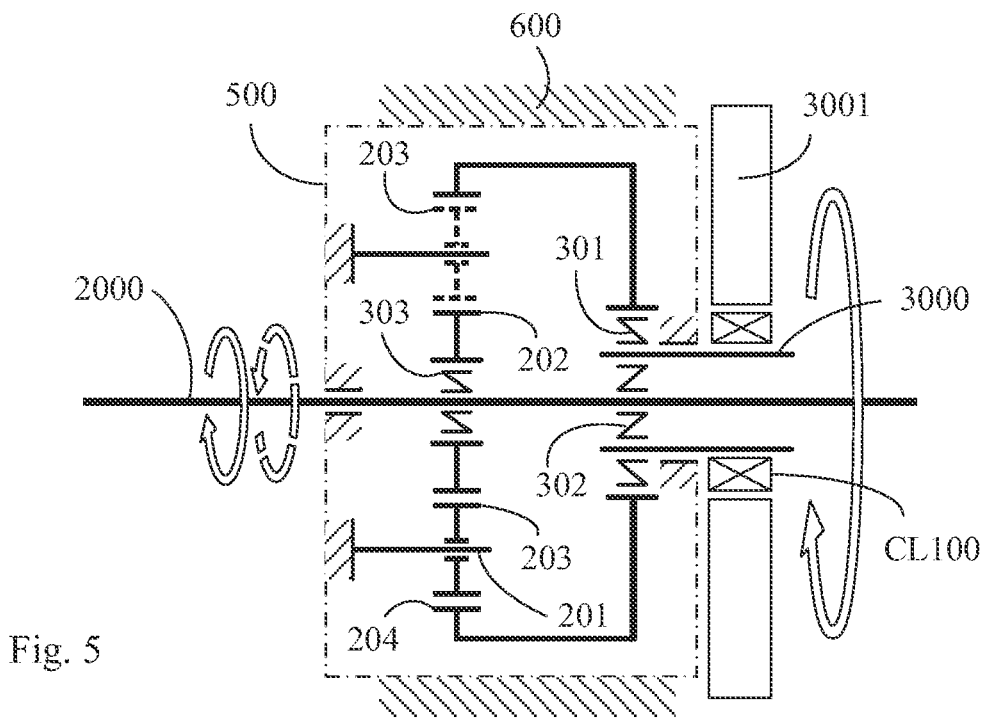
FIG. 5 is a schematic view illustrating a clutch device (CL100) being further installed between the output shaft (3000) shown in FIG. 1 and a revolving load (3001) according to one embodiment of the present invention.

According to the embodiment disclosed from FIG. 1 to FIG. 4, a clutch device (CL100) can be further installed between the output shaft (3000) and a revolving load (3001) for controlling the operations of coupling or releasing to the output;

FIG. 5 is a schematic view illustrating a clutch device (CL100) being further installed between the output shaft (3000) shown in FIG. 1 and a revolving load (3001) according to one embodiment of the present invention;

As shown in FIG. 5, the main characteristic is that the clutch device (CL100) is further installed between the output shaft (3000) shown in FIG. 1 and the revolving load (3001).

Figure 6:
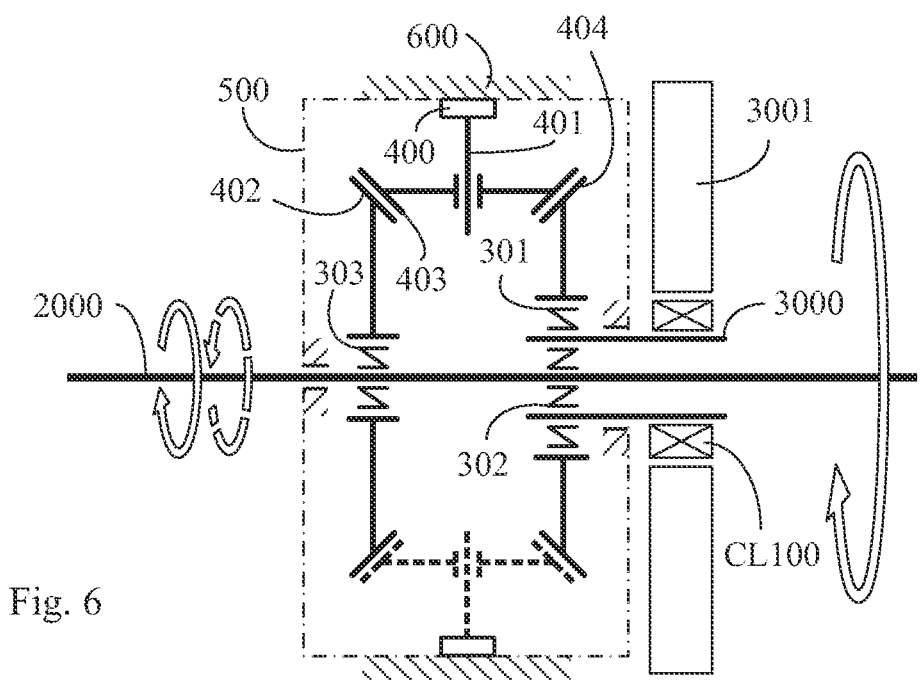
FIG. 6 is a schematic view illustrating a clutch device (CL100) being further installed between the output shaft (3000) shown in FIG. 2 and the revolving load (3001) according to one embodiment of the present invention.

FIG. 6 is a schematic view illustrating a clutch device (CL100) being further installed between the output shaft (3000) shown in FIG. 2 and the revolving load (3001) according to one embodiment of the present invention;

As shown in FIG. 6, the main characteristic is that the clutch device (CL100) is further installed between the output shaft (3000) shown in FIG. 2 and the revolving load (3001).

Figure 7:
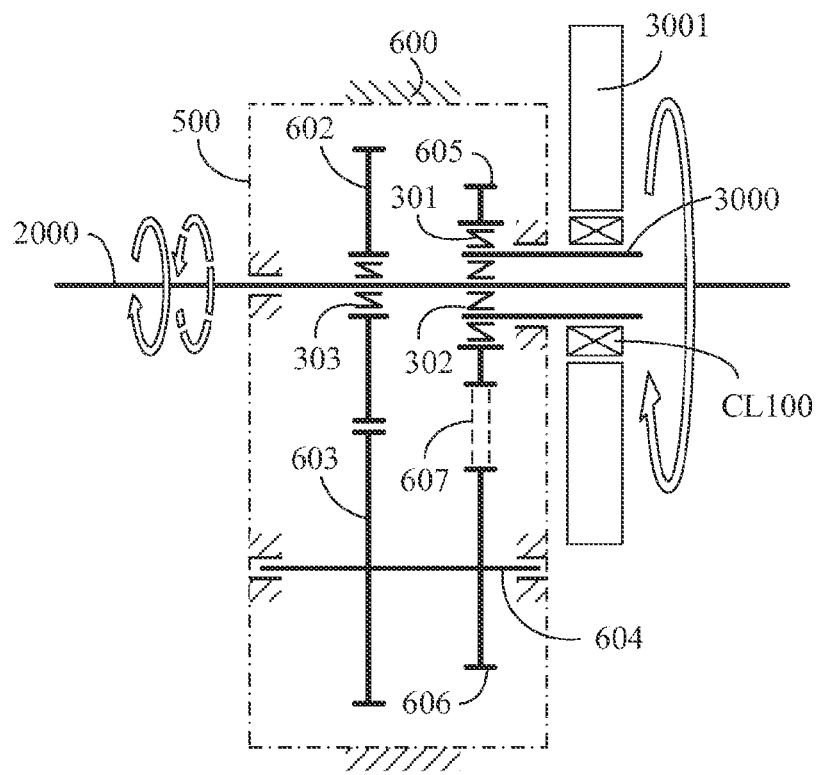
FIG. 7 is a schematic view illustrating a clutch device (CL100) being further installed between the output shaft (3000) shown in FIG. 3 and the revolving load (3001) according to one embodiment of the present invention.

FIG. 7 is a schematic view illustrating a clutch device (CL100) being further installed between the output shaft (3000) shown in FIG. 3 and the revolving load (3001) according to one embodiment of the present invention;

As shown in FIG. 7, the main characteristic is that the clutch device (CL100) is further installed between the output shaft (3000) shown in FIG. 3 and the revolving load (3001).

Figure 8:
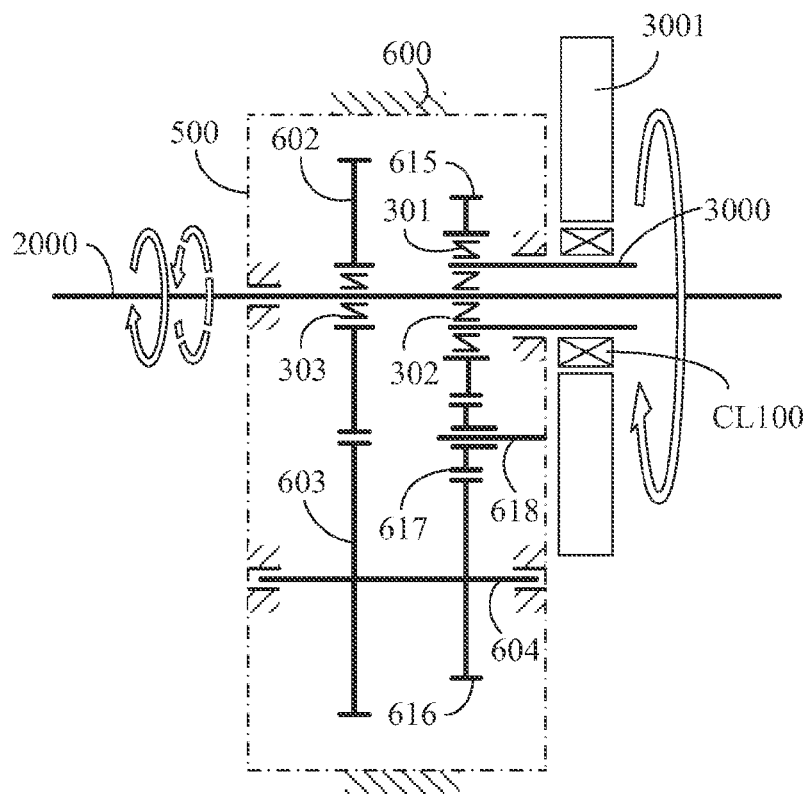
FIG. 8 is a schematic view illustrating a clutch device (CL100) being further installed between the output shaft (3000) shown in FIG. 4 and the revolving load (3001) according to one embodiment of the present invention.

FIG. 8 is a schematic view illustrating a clutch device (CL100) being further installed between the output shaft (3000) shown in FIG. 4 and the revolving load (3001) according to one embodiment of the present invention;

As shown in FIG. 8, the main characteristic is that the clutch device (CL100) is further installed between the output shaft (3000) shown in FIG. 4 and the revolving load (3001).

The clutch device (CL100) disclosed from FIG. 5 to FIG. 8 includes utilizing the manual force, or mechanical force, or torque, or centrifugal force, or electromagnetic force or hydraulic force for controlling the engaged operation for connecting the output shaft (3000) and the revolving load (3001) for transmission, or the disengaged operation for terminating the transmission relation between the output shaft (3000) and the revolving load (3001).

The invention claimed is:

1. A wheel system with bidirectional input and one-way output, comprising:
   a bi-directional rotating input shaft (2000) arranged to selectively rotate in a first rotating direction and in a second rotating direction opposite the first rotating direction;
   a constant direction rotating output part (3000);
   a first-rotating-direction wheel system including at least a first rotating direction input wheel (202,402,602) directly or indirectly coupled to a first rotating direction output wheel (204,404, 605,615); and
   a first unidirectional transmission device (303) installed between and directly engaged with the bi-directional input shaft (2000) and the first rotating direction input wheel (302,402,602);
   a second unidirectional transmission device (301) installed between the first rotating direction output wheel (204, 404,605,615) and the constant direction rotating output part (3000); and
   a third unidirectional transmission device (302) installed between the bi-directional rotating input shaft (2000) and the constant direction rotating output part (3000),
   wherein said first-rotating-direction wheel system drives said constant direction rotating output part (3000) via said first unidirectional transmission device (303) and the second unidirectional transmission device (301) in response to rotation of the bi-directional input shaft in the first rotating direction,
   wherein said bi-directional rotating input shaft (2000) drives the constant direction rotating output part (3000) via said third unidirectional transmission device (302) in response to rotation of the bi-directional input shaft in the second rotating direction, and
   wherein said input shaft (2000) is coupled to the first-rotating-direction wheel system and the output shaft (3000) exclusively through said unidirectional transmission devices (301,302,303) to prevent the first-rotating-direction wheel system from idling and reducing transmission of power to the rotating output part (3000) when the bi-directional input shaft is being rotated in the second rotating direction.

2. A wheel system with bidirectional input and one-way output as claimed in claim 1, wherein said input shaft is arranged to be driven by one of human powered input device, an engine, a fluid powered driving device, and an electric motor.

3. A wheel system with bidirectional input and one-way output as claimed in claim 1, wherein said first rotating direction input wheel (202,402,602) and said first rotating direction output wheel (204,404, 605,615) are gears or friction wheels.

4. A wheel system with bidirectional input and one-way output as claimed in claim 1, wherein said first-rotating-direction wheel system is a planetary wheel system, said first rotating direction input wheel is a sun wheel (202), said first rotating direction output wheel is a ring wheel (204), and further comprising at least one planetary wheel (203) connected between the sun wheel (202) and the ring wheel (204).

5. A wheel system with bidirectional input and one-way output as claimed in claim 4, further comprising a transmission wheel system housing (500), wherein said at least one planetary wheel (203) is rotatably mounted on a shaft (201) extending from the transmission wheel system housing (500).

6. A wheel system with bidirectional input and one-way output as claimed in claim 5, wherein said transmission wheel system housing (500) is combined with or installed on a machine body (600).

7. A wheel system with bidirectional input and one-way output as claimed in claim 4, further comprising a clutch device (CL100) installed between the rotating output part (3000) and a rotating load (3001).

8. A wheel system with bidirectional input and one-way output as claimed in claim 1, wherein said first-rotating-direction wheel system is a epicyclic wheel system, said first rotating direction input wheel is an inner bevel wheel (402), said first rotating direction output wheel is an outer bevel wheel (404), and further comprising at least one epicyclic wheel (403) connected between the inner bevel wheel (402) and the outer bevel wheel (404).

9. A wheel system with bidirectional input and one-way output as claimed in claim 8, further comprising a transmission wheel system housing (500), wherein said at least one epicyclic wheel (403) is rotatably mounted on a shaft (401) extending from the transmission wheel system housing (500).

10. A wheel system with bidirectional input and one-way output as claimed in claim 9, wherein said transmission wheel system housing (500) is combined with or installed on a machine body (600).

11. A wheel system with bidirectional input and one-way output as claimed in claim 8, further comprising a clutch device (CL100) installed between the rotating output part (3000) and a rotating load (3001).

12. A wheel system with bidirectional input and one-way output as claimed in claim 1, wherein said first-rotating-direction wheel system is a epicyclic wheel system, said first rotating direction input wheel is an input transmission wheel (602), said first rotating direction output wheel is an output transmission wheel (605,615), and further comprising a third transmission wheel (603), a transmission shaft (604) extending parallel to the input shaft (2000), and a fourth transmission wheel (606,616), said third and fourth transmission wheels (603,606,616) being mounted on said transmission shaft (604) and directly or indirectly coupled between the input transmission wheel (602) and the output transmission wheel (605,615).

13. A wheel system with bidirectional input and one-way output as claimed in claim 12, further comprising a transmission wheel system housing (500), wherein said transmission shaft (604) is mounted to said transmission wheel system housing (500).

14. A wheel system with bidirectional input and one-way output as claimed in claim 13, wherein said transmission wheel system housing (500) is combined with or installed on a machine body (600).

15. A wheel system with bidirectional input and one-way output as claimed in claim 12, wherein said fourth transmission wheel (606) is coupled to the output transmission wheel (605) by a transmission device that includes at least one of a gear train, chain wheel set, and pulley-driven transmission belt (607).

16. A wheel system with bidirectional input and one-way output as claimed in claim 15, further comprising a clutch device (CL100) installed between the rotating output part (3000) and a rotating load (3001).

17. A wheel system with bidirectional input and one-way output as claimed in claim 12, wherein said fourth transmission wheel (616) is coupled to the output transmission wheel (615) by a fifth transmission gear (617) mounted on a shaft (618) extending from a transmission wheel system housing (500).

18. A wheel system with bidirectional input and one-way output as claimed in claim 17, further comprising a clutch device (CL100) installed between the rotating output part (3000) and a rotating load (3001).

19. A wheel system with bidirectional input and one-way output as claimed in claim 1, wherein said input shaft (2000) coaxially extends through said rotating output part (3000).

20. A wheel system with bidirectional input and one-way output as claimed in claim 1, wherein an input/output transmission ratio of said wheel system is the same when said input shaft (2000) is rotated in said first and second rotating directions.

* * * * *